United States Patent [19]
Huang et al.

[11] Patent Number: 5,483,551
[45] Date of Patent: Jan. 9, 1996

[54] CROSSTALK SUPPRESSION TECHNIQUE

[75] Inventors: Gang Huang, Highlands; Gi-Hong Im, Middletown; Jean-Jacques Werner, Holmdel, all of N.J.

[73] Assignee: AT&T Corp., Murray Hill, N.J.

[21] Appl. No.: 100,584

[22] Filed: Jul. 30, 1993

[51] Int. Cl.$^6$ .................. H04B 1/38; H04L 5/16
[52] U.S. Cl. .............. 375/219; 375/285; 270/32.1
[58] Field of Search ................ 375/7, 51, 58, 375/60, 109, 8, 10; 370/6, 14, 15, 17, 32, 32.1, 104.1, 108; 379/392, 406, 410, 411; 455/67.1, 67.3, 67.6, 69, 295, 296, 18, 9, 10

[56] References Cited

U.S. PATENT DOCUMENTS

| | | | |
|---|---|---|---|
| 3,588,703 | 6/1971 | Sorkin | 375/109 |
| 4,151,524 | 4/1979 | Caputi, Jr. | 375/58 |
| 4,622,682 | 11/1986 | Kumakura | 375/58 |
| 4,839,907 | 6/1989 | Saneski | 375/113 |
| 4,864,608 | 9/1989 | Miyamoto et al. | 370/32.1 |
| 5,239,666 | 8/1993 | Triby | 455/226.2 |

OTHER PUBLICATIONS

G. H. Im and J. J. Werner, "Bandwidth–Efficient Digital Transmission up to 155 Mb/s over Unshielded Twisted Pair Wiring", ICC '93, Geneva.

B. R. Peterson and D. D. Falconer, "Minimum Mean Square Equalization in Cyclostationary and Stationary Interference–Analysis and Subscriber Line Calculations", IEEE Journal on Selected Areas in Communications, vol. 9, No. 6, Aug. 1991, pp. 931–940.

Primary Examiner—Stephen Chin
Assistant Examiner—Don N. Vo
Attorney, Agent, or Firm—David R. Padnes; Thomas Stafford

[57] ABSTRACT

To reduce near-end crosstalk (NEXT) in systems possessing excess bandwidth, a signal is transmitted from a first to a second location. At the second location, the received signal is examined and a characteristic of this signal is determined while the delay provided in the transmit signal path at this location is varied. Based on this examination, a particular amount of delay is introduced into the transmit signal path which reduces NEXT. This process is repeated for each direction of transmission. In the disclosed embodiment, the characteristic of the received signal which is determined is the mean square error and the amount of delay selected is that corresponding to the minimum mean square error.

9 Claims, 2 Drawing Sheets

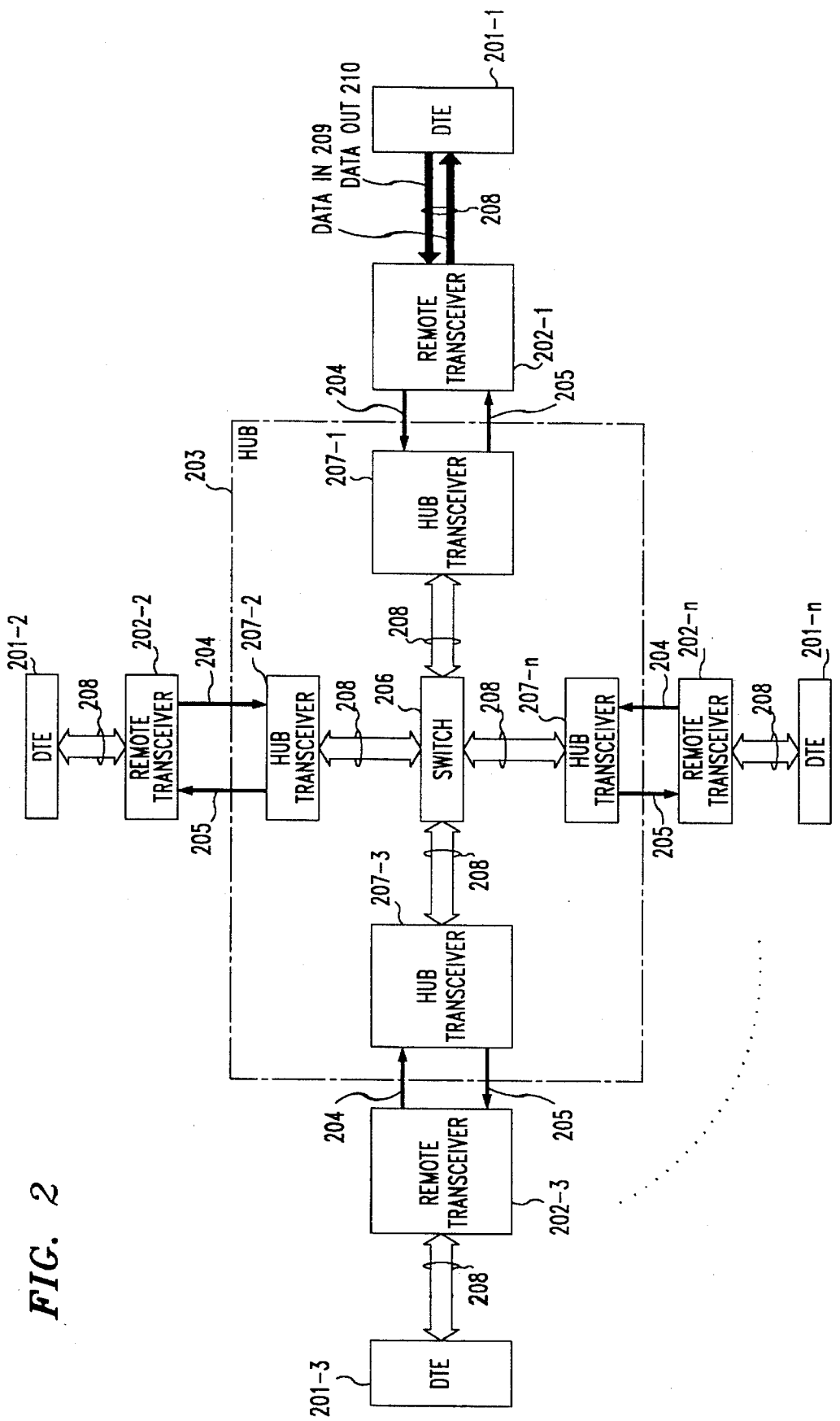

CROSSTALK SUPPRESSION TECHNIQUE

TECHNICAL FIELD

The present invention relates to a distortion suppression technique and, more particularly, to one such technique for suppressing near-end crosstalk in communications systems.

BACKGROUND OF THE INVENTION

Distortion, such as crosstalk, is a common impairment in communication systems. Near-end crosstalk (NEXT) refers to the undesirable coupling of a signal transmitted in one direction into the signal transmitted in the opposite direction. This can arise in a variety of system applications. In one common scenario, a signal transmitted from a transceiver onto a full-duplex link is coupled back into the receiver of that transceiver. NEXT cancellers have been used to reduce NEXT in such occurrences. Typically, the NEXT canceller is disposed at a particular location and cancels the NEXT in the received signal at that location. This is accomplished by processing the received signal at the particular location along with the signal transmitted from this location. The shortcoming of NEXT cancellers is that their cost and complexity exceed the objectives of certain system applications. Accordingly, it would be desirable if a less costly and complex technique for reducing NEXT could be developed.

SUMMARY OF THE INVENTION

Broadly, the present invention addresses the problem of reducing NEXT in systems possessing excess bandwidth. Pursuant to the present invention, a signal is transmitted from a first transceiver to a second. At the second transceiver, the received signal is examined and a characteristic of this signal is determined while a plurality of different delays are introduced into the signal transmitted by this transceiver. Based on this examination, a particular amount of delay is introduced into the transmit signal path of the second transceiver which reduces the NEXT in the signal received by this transceiver. By repeating this process at the first transceiver, the NEXT in the signal received by this transceiver can also be reduced. In the disclosed embodiment, the characteristic of the received signal which is determined is the mean square error and the amount of delay selected is that corresponding to the minimum mean square error. Advantageously, this technique can be used alone or in combination with NEXT cancellers.

BRIEF DESCRIPTION OF THE DRAWING

FIG. 2 is a block-schematic diagram of a second illustrative communications system which incorporates the present invention.

DETAILED DESCRIPTION

Figure 1:
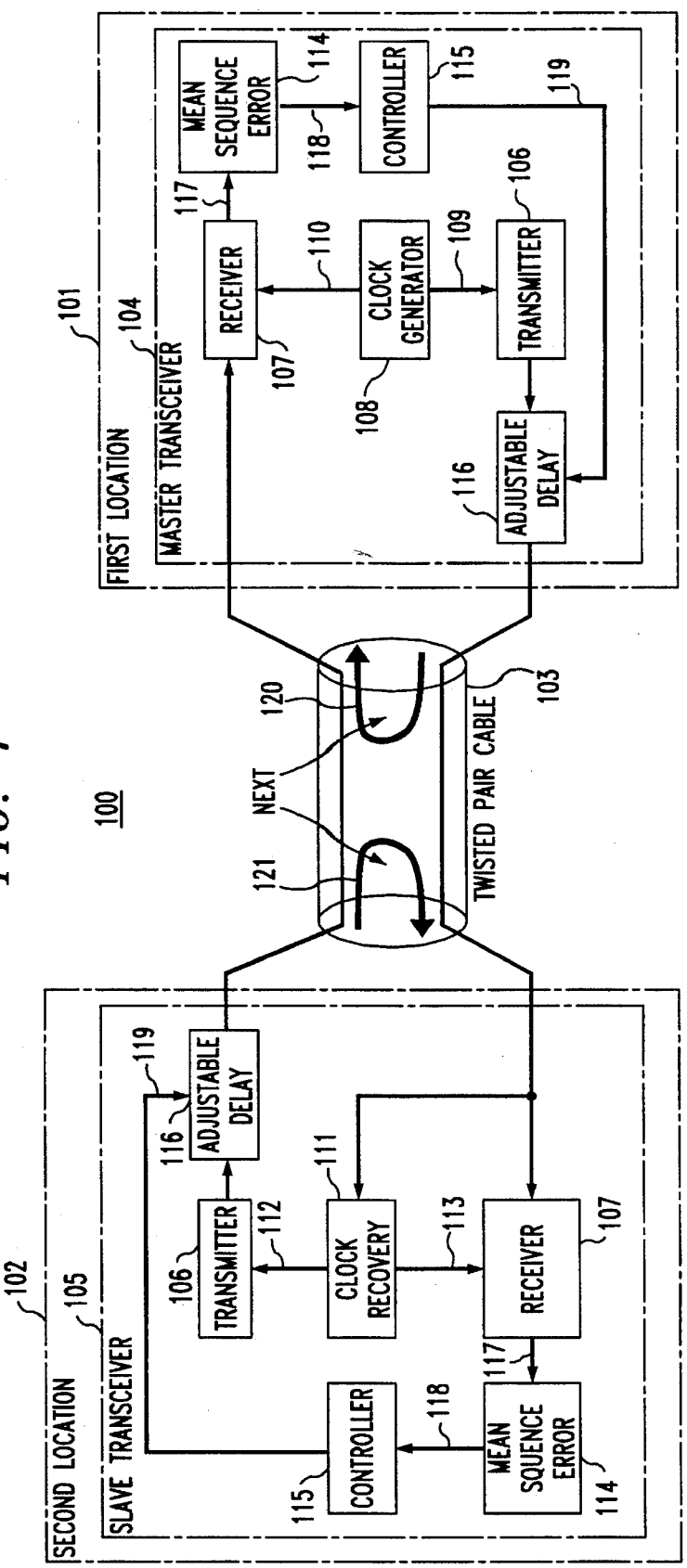
FIG. 1 is a block-schematic diagram of a first illustrative communications system which incorporates the present invention.

In each of the embodiments to be discussed, it will be assumed that each communications systems is designed with excess bandwidth; that is, the bandwidth allocated for communication purposes is greater than that theoretically required. As is well-known, for any communication system in which information is transmitted at some baud rate, there is an associated theoretical minimum bandwidth required. For example, in baseband systems, the minimum bandwidth (expressed in Hertz) is one-half of the symbol rate (expressed in baud). Or, for example, in two-dimensional passband systems, the minimum bandwidth (expressed in Hertz) is equal to the symbol rate (expressed in baud). Allocation of just this bandwidth, while desirable from the standpoint of bandwidth utilization, can be difficult or impossible to realize in certain applications. Although the present invention is applicable to systems having any non-zero excess bandwidth, the amount of excess bandwidth is typically at least 100 percent. Accordingly, the amount of bandwidth allocated is at least twice that theoretically required.

As shown in FIG. 1, point-to-point communications system 100 couples data between first location 101 and second location 102 via a full-duplex communications link 103. At this juncture, it should be understood that while a single point-to-point communications system is shown, it is advantageous to utilize the present invention in a point-to-point communications system when a plurality of such systems are aggregated in a communications arrangement.

The link in FIG. 1 is a twisted pair cable and transceivers 104 and 105, each including a transmitter 106 and a receiver 107, are respectively disposed at the first and second locations. Each transmitter and receiver is a conventional design and may include distortion compensation apparatus, such as equalizers, NEXT cancellets, etc. Preferably, each receiver incorporates a fractionally-spaced equalizer since the use of such an equalizer in a communication system utilizing excess bandwidth provides some degree of NEXT suppression and the incorporation of the present invention in such arrangements can provide even greater suppression of the NEXT. In addition, the utilization of the present invention in a communication system utilizing excess bandwidth and a fractionally-spaced equalizer can provide NEXT suppression at the receiver of a transceiver even when the NEXT is coupled from a signal which is not transmitted by this transceiver. This situation can arise when a plurality of four-wire paths are in close proximity to one another. More specifically, a NEXT signal may be coupled into a signal propagating in one direction in a four-wire path and destined for one transceiver from another signal transmitted in the opposite direction by a different transceiver onto a different four-wire path.

Transceivers 104 and 105 are respectively referred to as "master" and "slave". These descriptors refer to the fact that transceiver 104 includes a local clock generator 108 which synchronizes the operation of the transmitter and receiver via leads 109 and 110 while transceiver 105 includes a conventional clock recovery circuit 111 which recovers the clock signal from the received signal at the second location and couples this recovered clock to the transmitter and receiver of transceiver 105 via leads 112 and 113. Accordingly, the operation of transceiver 105 is "slaved" to the operation of transceiver 104. It should be noted that while clock generator 108 is internal to transceiver 101, the clock signal provided by this generator could be externally generated and supplied to the transceiver.

As indicated in FIG. 1, NEXT exists at the first location in that a portion of the signal transmitted by transceiver 104 is coupled to the receiver of this transceiver. This coupling is indicated by arrow 120. Similarly, NEXT also exists at the second location, i.e., a portion of the signal transmitted from this location appears in the receiver at this location. This is indicated by arrow 121.

To reduce the NEXT, each transceiver in FIG. 1 also includes Mean Square Error (MSE) measurement unit 114, controller 115 and variable delay device 116. The MSE unit is supplied with the error signal formed within the receiver and used therein to update adaptive circuitry. This error signal appears on bus 117. The MSE is determined from this error signal and, as will be more fully described, is coupled on lead 118 to controller 115. The controller, in response to the determined MSE, varies the delay provided by device 116 via lead 119.

In system 100, the data coupled between the first and second locations is a digital signal and, for purposes of illustration, it will be assumed that system 100 utilizes quadrature amplitude modulation (QAM) so that the digital signal is transformed into a pair of symbol streams. It should, of course, be understood that the present invention is not limited to QAM modulation but can be used with a variety of passband and baseband digital formats.

In QAM modulation, one of these streams is designated as the in-phase (I) channel while the other is designated as the quadrature (Q) channel. The I and Q channels, in well-known fashion, each modulate a different carrier signal in a pair of quadrature-related carrier signals. These operations occur within each transmitter 106. Within each receiver, after propagation through link 103, the incoming modulated carrier signals are demodulated, the demodulated signals are sampled at the symbol rate or a multiple thereof, and the transmitted information is recovered using a decision device.

Each I and Q symbol in QAM modulation can have one of a predetermined set of values wherein the number of values in the set is a function of the particular QAM modulation. For example, in 16 QAM, each symbol can have any one of four permissible values, while in 64 QAM, each symbol can have any one of eight permissible values. The MSE is the mean or average of the square of the error signal. The error signal at each sample time is the difference between each recovered symbol value and the closest one of the permissible symbol values. If one would square the magnitude of this error and then average the squared errors over time, one obtains the MSE.

The underpinning of applicants' invention is that it has been found that if one introduces a delay into the signal transmitted by a transceiver, the amount of NEXT introduced at the decision device in the receive portion of that transceiver will vary. Moreover, the MSE is a good indicator of the effect of NEXT. Therefore, by measuring the MSE for different delays, one can arrive at an optimum amount of delay, i.e., an amount of delay which minimizes the MSE and, therefore, the NEXT. Pursuant to the present invention, the MSE is determined for each of a plurality of different delays and the delay corresponding to the minimum MSE is selected. This optimum delay determination is performed for each direction of transmission. For example, referring to FIG. 1, while signals are transmitted from the first location to the second and vice versa, at the second location, within the slave transceiver, controller 115 sets device 116 to provide a number of different delays. For each delay, unit 114 determines the MSE and couples the results on lead 118 to controller 115. After these measurements, the controller sets the device 116 to provide the amount of delay corresponding to the minimum MSE. This process is then repeated at the second location. More specifically, transmitter 106 in the slave transceiver transmits a signal through unit 116, which has now been set to provide some specific amount of delay, to receiver 117 in master transceiver 104. Within the master transceiver, unit 114, controller 115 and unit 116 operate as described previously so as to adjust delay unit 116 to provide an amount of delay which minimizes the MSE.

The incoming signal processed by the receiver and from which the MSE is determined for each of a plurality of delays, could be a signal whose values are not a priori known to the receiver. This adjustment process is then similar to the "blind" adaptation process used to adjust adaptive devices, such as equalizers and echo cancellers. Or, preferably, the incoming signal for this process could be one whose values are a priori known to the receiver. In such case, the incoming signal is commonly referred to as a training sequence. The preference for the use of a training sequence is that it requires a shorter time for optimum delay determination. This is especially true in receivers incorporating adaptive devices, such as equalizers, cancellers, etc. For the use of a training sequence, it is assumed that each transceiver includes a source of one or more training sequences which can be transmitted at predetermined times with the frequency of such times being a function of the time-varying nature of the NEXT characteristic.

FIG. 2 shows another illustrative communications system 200 which incorporates the present invention. System 200, arranged in a star topology, provides communications capabilities among a plurality of digital terminal equipment (DTEs) designated as 201-1, 201-2, 201-3 . . . 201-n. Each of these DTEs is respectively connected to an associated remote transceiver 202-1, 202-2, 202-3 . . . 202-n. Each of these remote transceivers is connected to hub 203 via a corresponding "toward-the-hub" link 204 and "from-the-hub" link 205. Hub 203 includes a switch 206 which communicates with a plurality of hub transceivers 207-1, 207-2, . . . 207-n and each such transceiver is connected to a different hub transceiver. The connection between the DTEs and their associated remote transceivers and between the controller and its hub transceivers is provided by buses 208. Each of these buses includes data-in and data-out leads 209 and 210.

In accordance with the present invention, each of the remote and hub transceivers includes the transceiver circuitry shown in FIG. 1. More specifically, for each of the directly connected hub and remote transceivers, e.g., 202-1 and 207-1, 202-2 and 207-2, etc., one transceiver in each directly connected pair is designated as the master while the other is designated as the slave. Each master and slave transceiver respectively incorporates the circuitry of transceivers 104 and 105. The MSE determination and delay selection process is performed for each link 204 and 205.

It should, of course, be noted that while the present invention has been described in terms of an illustrative embodiment, other arrangements will be apparent to those of ordinary skill in the art. First, for example, while the disclosed embodiments of the present invention have been described relative to discrete devices, these devices can be implemented using one or more appropriately programmed general-purpose processors, or special-purpose integrated circuits, or digital processors, or an analog or hybrid counterpart of any of these devices. Second, while QAM modulation is utilized in the disclosed embodiments, the present invention can be used with a number of other modulation techniques, such as carrierless amplitude/phase (CAP) and phase shift keying (PSK). Indeed, the present invention can be used with analog or digital systems so long as the information to be conveyed is sampled and such sampling is performed at a periodic rate. Moreover, this periodic rate can either be fixed or can be set at some rate for an associated time interval and then reset to some other rate for another associated time interval. Third, while the disclosed embodiments utilize the MSE to determine the appropriate delay, other signal characteristics, such as the integral of the square of the error signal, mean of the absolute value of the error signal, or integral of the absolute value of the error signal, can also be utilized. Fourth, while the adjustable delay unit in the disclosed embodiments is located just prior to the communications link, this unit can be disposed in a number of different locations within a transmitter. Finally, the present invention is not limited to the disclosed point-to-point and star topologies, respectively shown in FIGS. 1 and 2, and can be employed in other topologies, such as multipoint arrangements.

We claim:

1. Transceiver apparatus including a transmitter and a receiver for use in a communications system, said apparatus comprising means in the receiver being responsive to an incoming signal after propagation through a communications channel for determining a predetermined signal characteristic; and means in the transmitter being responsive to said determined predetermined characteristic for providing a particular amount of delay into an outgoing signal transmitted by said transmitter in said transceiver apparatus to reduce near-end crosstalk in said communications channel.

2. The apparatus of claim 1 wherein said communications channel introduces distortion which causes said incoming signal to differ from what was originally transmitted and said predetermined characteristic is a function of this difference.

3. The apparatus of claim 2 wherein said predetermined signal characteristic is an average of the algebraic square of this difference over some time interval.

4. The apparatus of claim 1 wherein said determining apparatus makes its determination by measuring said predetermined characteristic for a plurality of different delays provided to said outgoing signal.

5. The apparatus of claim 4 wherein said determining means selects said particular amount of delay corresponding to a minimum value of said predetermined characteristic.

6. The apparatus of claim 1 wherein said determining means determines a mean square error signal.

7. The apparatus of claim 6 wherein said determining means determines a minimum value for said mean square error signal.

8. A method for use in a transceiver apparatus including a transmitter and a receiver for use in a communications system, said method comprising the steps of determining in the receiver a predetermined signal characteristic of the incoming signal after propagation through a communication channel; and providing a particular amount of delay into an outgoing signal transmitted by said transmitter in said transceiver apparatus in response to said determined predetermined characteristic to reduce near-end crosstalk in said communications channel.

9. A communications system comprising a first transceiver including a first transmitter and a first receiver coupled to a second transceiver including a second transmitter and second receiver via a communications link, said first transceiver comprising means in said first transmitter for transmitting a signal in said communications link to said second receiver in said second transceiver and said second transceiver comprising means in said second receiver being responsive to said signal after propagation through the communications link for determining a predetermined signal characteristic; and means in said second transmitter being responsive to said determined characteristic for providing a particular amount of delay into an outgoing signal transmitted by the transmitter of said second transceiver to reduce near-end crosstalk in said communications link.

* * * * *